July 2, 1957     A. G. BADE     2,797,585
MULTI-SPEED DRIVE
Filed Nov. 4, 1954     4 Sheets-Sheet 4
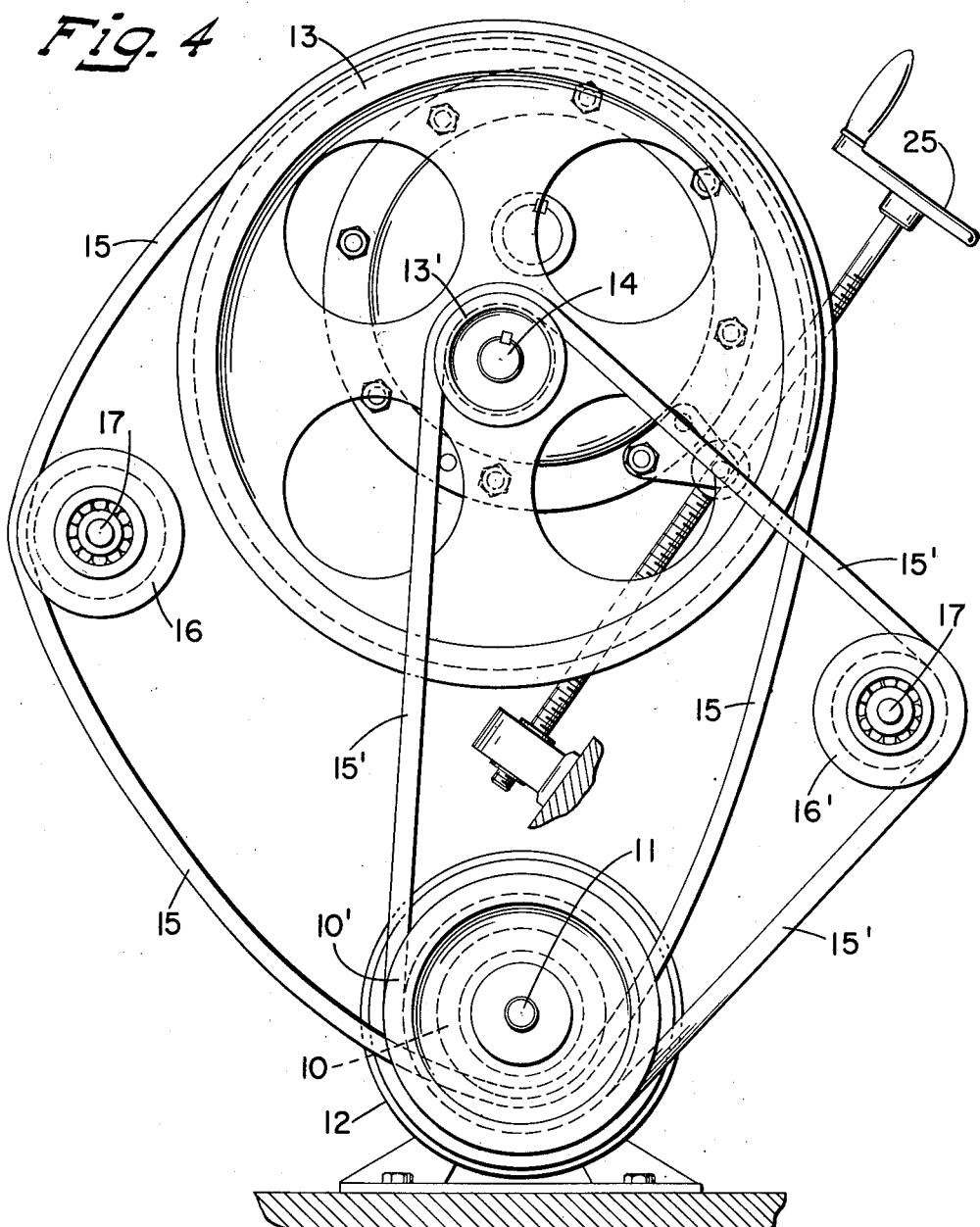
INVENTOR.
Alfred G. Bade
BY
Attorney United States Patent Office 2,797,585
Patented July 2, 1957

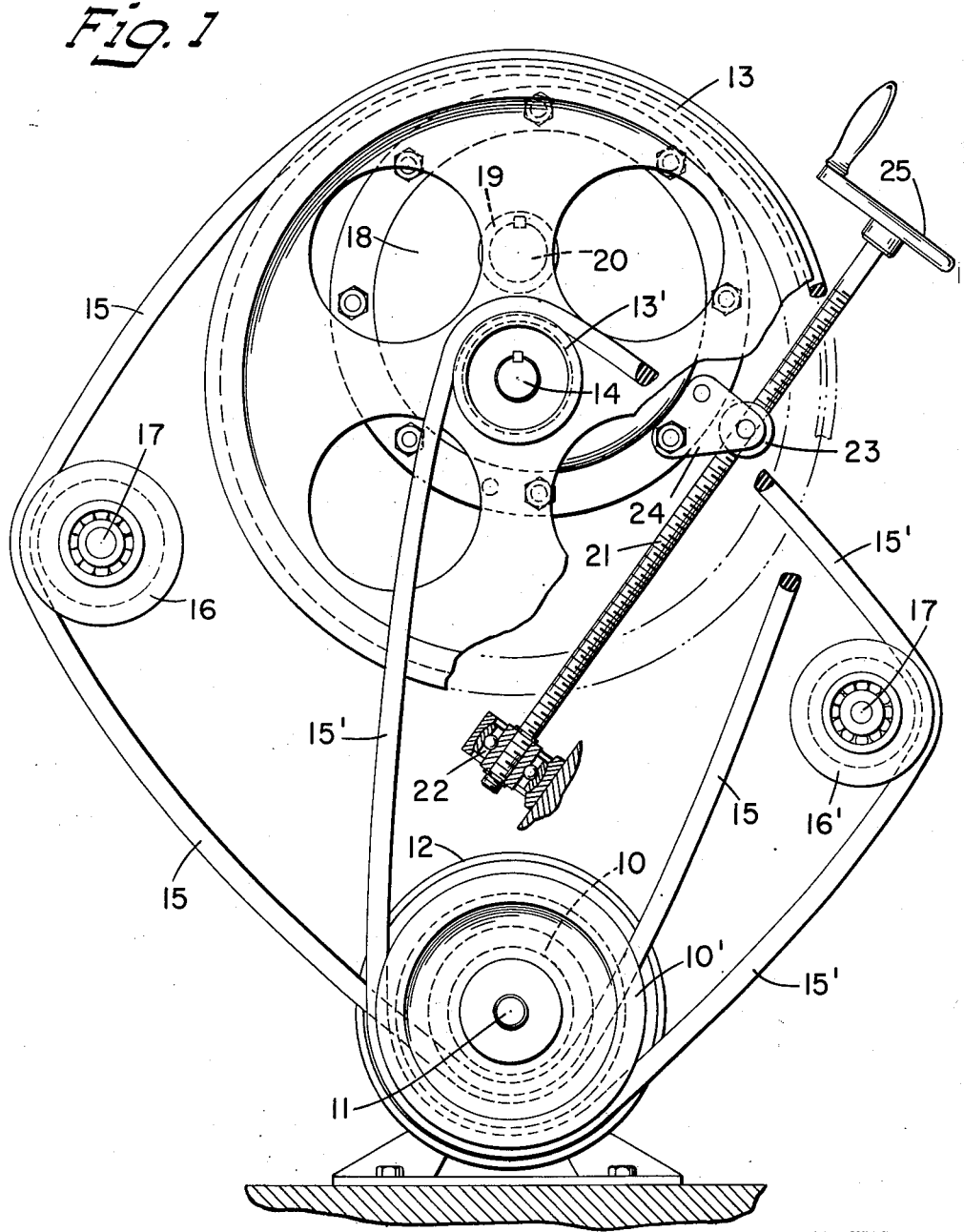

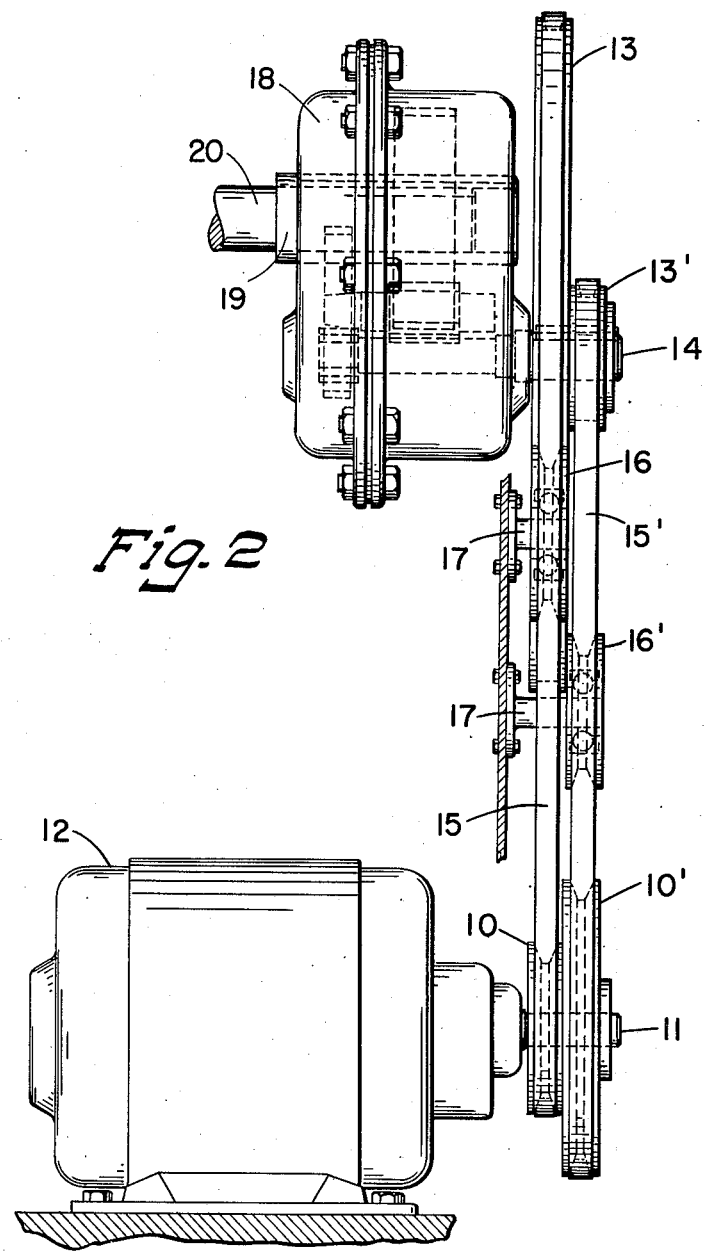

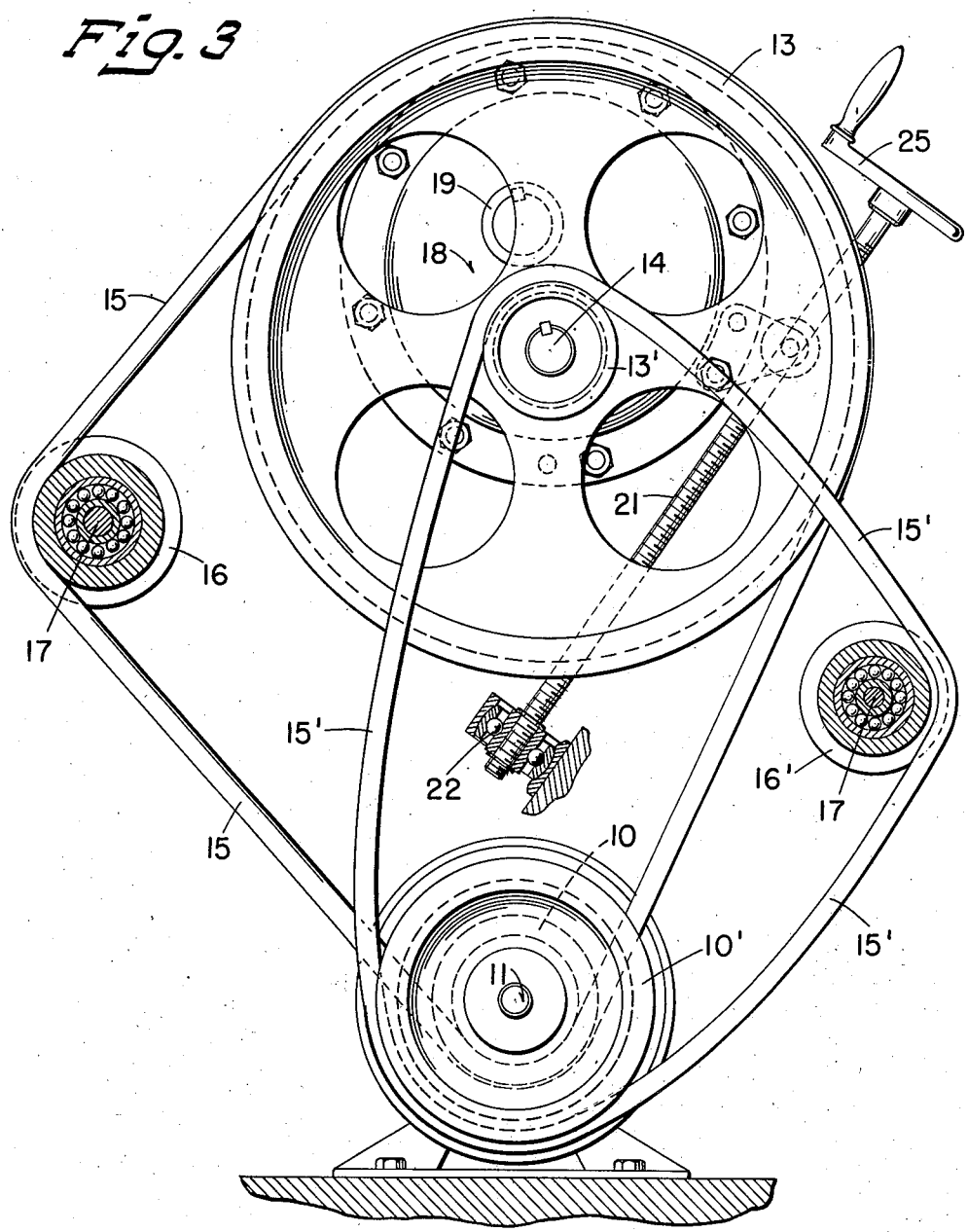

2,797,585
MULTI-SPEED DRIVE

Alfred G. Bade, Wauwatosa, Wis., assignor to The Falk Corporation, Milwaukee, Wis., a corporation of Wisconsin Application November 4, 1954, Serial No. 466,778

8 Claims. (Cl. 74—217)

This invention relates to multi-speed drives.

One object of the present invention is to provide a simple and inexpensive yet reliable device for effecting operation of a driven mechanism at one or another of widely different speeds by power derived from a single speed source.

To this end separate belt-and-pulley connections are employed between driving and driven shafts, together with pulley shifting mechanism by which said connections are rendered selectively effective without necessitating the use of clutches or the like ordinarily required in multi-speed drives.

Another object is to utilize to advantage a swingable gear set as a pulley shifting mechanism for purposes indicated.

Other objects and advantages will appear, expressed or implied, from the following description of a two-speed drive embodying this invention.

In the accompanying drawings:

Figure 1 is a view in front elevation of a two-speed drive constructed in accordance with the present invention.

Fig. 2 is a view in side elevation thereof.

Fig. 3 is a view similar to that of Fig. 1 illustrating the relative position of parts for low speed operation.

Fig. 4 is a view similar to that of Fig. 2 illustrating the relative position of parts for high speed operation.

The drive shown includes a pair of coaxial drive pulleys 10 and 10' keyed or otherwise fixed to the armature shaft 11 of an electric motor 12 for rotation therewith, and a pair of coaxial driven pulleys 13 and 13' keyed or otherwise fixed to a shaft 14 for rotation therewith. In this instance pulley 10 is smaller than pulley 10' and pulley 13 is larger than pulley 13'.

A belt 15 is trained about the small drive pulley 10 and large driven pulley 13, and a separate belt 15' is trained about the large drive pulley 10' and the small driven pulley 13'. The belts 15 and 15' are guided by separate laterally offset idler pulleys 16 and 16' journalled on suitable pintles 17 fixedly mounted.

In this instance the shaft 14, carrying the pair of driven pulleys 13 and 13', constitutes the input shaft of a shaft-mounted speed reducer of a well-known type. The speed reducer shown is fully disclosed in my copending application Serial No. 293,793, now Patent No. 2,762,632, and includes a housing 18 inclosing a speed reduction gear train (indicated in broken lines) through which the input shaft 14 is drivingly connected to an output shaft 19. The shaft 19 is hollow to telescopically receive the projecting end of the drive shaft 20 of a driven mechanism to which it is keyed or otherwise drivingly connected. The housing 18 is supported by the shafts 19 and 20 and swingable about the common axis thereof, thereby rendering the input shaft 14 laterally movable since it is laterally offset from the shafts 19 and 20.

The position of the shaft 14 is varied and controlled by appropriate means such as a screw 21 journalled at one end in a fixed bearing 22 and threaded in and through a suitable nut 23 rockably supported in a bracket 24 fixed to the periphery of the housing 18. In this instance the screw 21 is shown equipped with a hand wheel 25 by which it may be manipulated to swing the housing 18 about the axis of the shaft 20 with a consequent lateral movement of the shaft 14 and the pulleys 13 and 13' as a unit therewith.

In the position of parts shown in Fig. 1, the shaft 14 is in an intermediate position and both belts 15 and 15' are slack so that no motion is transmitted to either of the pulleys 13 or 13' from the drive pulleys 10 or 10'.

By appropriate manipulation of the screw 21 the housing 18 may be swingably adjusted to shift the shaft 14 from the idler pulley 16 toward the idler pulley 16' into the position shown in Fig. 3, in which position the belt 15 is tensioned and thereby rendered effective to drive the pulley 13 from pulley 10, whereupon shaft 14 and, consequently, shafts 19 and 20 are driven at relatively low speed.

Conversely, by reverse manipulation of the screw 21, the shaft 14 may be shifted from the idler pulley 16' toward the idler pulley 16 into the position shown in Fig. 4, in which position the belt 15 is slackened and belt 15' is tensioned to drivingly connect the large drive pulley 10' to the small driven pulley 13', whereupon the shaft 14 and consequently the shafts 19 and 20 are driven at relatively high speeds.

Various changes may be made in the embodiment of the invention hereinabove specifically described without departing from or sacrificing the advantages of the invention as defined in the appended claims.

I claim:

1. In a drive of the character described, the combination of a set of connected coaxial drive pulleys, a corresponding set of connected coaxial driven pulleys, a corresponding set of belts each trained about one of said drive pulleys and one of said driven pulleys, a corresponding set of laterally offset idler pulleys each engageable with one of said belts to tension the same, and means for shifting one of said sets of coaxial pulleys laterally as a unit to tension one or another of said belts selectively to thereby connect one of said drive pulleys in driving relation with one of said driven pulleys.

2. A drive as defined in claim 1 wherein said set of coaxial driven pulleys is shiftable by said shifting means to tension one or another of said belts selectively.

3. In a drive of the character described, the combination of a pair of connected coaxial drive pulleys, a pair of connected coaxial driven pulleys, a pair of belts each trained about one of said drive pulleys and one of said driven pulleys, a pair of laterally offset idler pulleys each engageable with one of said belts to tension the same, and means for laterally shifting one of said pairs of coaxial pulleys as a unit to tension said belts alternatively to thereby selectively connect one of said drive pulleys in driving relation with one of said driven pulleys.

4. In a drive of the character described, the combination of a drive shaft, a pair of drive pulleys mounted thereon for rotation therewith, a driven shaft, a pair of driven pulleys mounted on said driven shaft for rotation therewith, a pair of belts each trained about one of drive pulleys and one of said driven pulleys, and a pair of laterally offset idler pulleys each engageable with one of said belts to tension the same, one of said shafts being laterally shiftable to tension one or the other of said belts selectively to thereby render one or the other effective to drive one of said driven pulleys from one of said drive pulleys.

5. A drive as defined in claim 4 wherein said drive pulleys are of different sizes.

6. A drive as defined in claim 4 wherein said driven pulleys are of different sizes.

7. A drive as defined in claim 4 wherein the driven shaft is shiftable to tension one of the other of said belts selectively.

8. In a drive of the character described the combination of a speed reducer having an output shaft for support thereby and also having an input shaft geared to said output shaft and swingably supported by and from the latter, a pair of pulleys fixed to said input shaft, a pair of coaxial motor driven pulleys, a pair of belts each trained about a pulley of each of said pairs, a fixedly mounted idler pulley engageable with each of said belts, and means for laterally shifting said input shaft to thereby tension one or the other of said belts selectively to thereby drivingly connect a pulley of one of said pairs to a pulley of the other of said pairs.

References Cited in the file of this patent

UNITED STATES PATENTS

| 881,086 | Stevens | Mar. 3, 1908 |
| 1,450,019 | Canning | Mar. 27, 1923 |
| 2,051,289 | Custer | Aug. 18, 1936 |

FOREIGN PATENTS

| 1,528 | Great Britain | Pat. of 1898 |